(12) United States Patent
Mitchum et al.

(10) Patent No.: US 10,738,872 B2
(45) Date of Patent: Aug. 11, 2020

(54) SCISSORS GEAR

(71) Applicant: Cummins Inc., Columbus, IN (US)

(72) Inventors: Gregory J. Mitchum, Franklin, IN (US); Benjamin D. Snider, Columbus, IN (US); Philip W. Burbrink, Columbus, IN (US); John G. Allman, Edinburgh, IN (US)

(73) Assignee: Cummins Inc., Columbus, IN (US)

( * ) Notice: Subject to any disclaimer, the term of this patent is extended or adjusted under 35 U.S.C. 154(b) by 644 days.

(21) Appl. No.: 15/133,963

(22) Filed: Apr. 20, 2016

(65) Prior Publication Data

US 2016/0230872 A1    Aug. 11, 2016

Related U.S. Application Data

(62) Division of application No. 13/967,932, filed on Aug. 15, 2013, now Pat. No. 9,341,253.

(51) Int. Cl.
*F16H 55/18* (2006.01)
*F16H 57/12* (2006.01)

(52) U.S. Cl.
CPC .............. *F16H 55/18* (2013.01); *F16H 57/12* (2013.01); *F16H 2057/125* (2013.01); *Y10T 29/49464* (2015.01); *Y10T 74/19623* (2015.01)

(58) Field of Classification Search
CPC .... F16H 55/18; F16H 57/12; F16H 2057/125; B24B 47/00; Y10T 74/19623; Y10T 74/19898; Y10T 29/49464
USPC .......................................... 74/409, 395, 440
See application file for complete search history.

(56) References Cited

U.S. PATENT DOCUMENTS

| | | | | |
|---|---|---|---|---|
| 1,033,468 A | * | 7/1912 | Raymond | F16H 55/18 74/440 |
| 1,558,222 A | * | 10/1925 | Beetow | F16H 55/18 74/440 |
| 1,755,945 A | * | 4/1930 | Alexandrescu | F16H 55/18 74/440 |
| 2,382,846 A | | 8/1945 | Barber | |
| 3,127,784 A | * | 4/1964 | O'Neill | F16H 55/18 74/440 |
| 3,296,881 A | * | 1/1967 | Seabeck | F16H 55/18 74/440 |
| 3,329,035 A | * | 7/1967 | Herr | F16H 57/12 74/409 |
| 3,535,949 A | * | 10/1970 | Bauer | F16H 55/18 74/440 |
| 3,803,936 A | | 4/1974 | Kroeper | |
| 4,189,951 A | * | 2/1980 | Sauter | F16H 55/18 29/893.33 |
| 4,660,432 A | * | 4/1987 | Damas | F16H 55/18 464/85 |
| 4,805,475 A | * | 2/1989 | Hannel | F16H 55/18 74/409 |

(Continued)

FOREIGN PATENT DOCUMENTS

| | | | |
|---|---|---|---|
| JP | 2010133483 A | * | 6/2010 |
| JP | 5284065 B2 | * | 9/2013 |
| KR | 20020044649 A | * | 6/2002 |

*Primary Examiner* — Bobby Rushing, Jr.
(74) *Attorney, Agent, or Firm* — Taft Stettinius & Hollister LLP

(57) ABSTRACT

A variety of scissors gear assemblies are disclosed that utilize integral parts or common tools to align teeth of the scissors gear assembly. Methods of use are also disclosed.

10 Claims, 10 Drawing Sheets

(56) References Cited

U.S. PATENT DOCUMENTS

| | | | |
|---|---|---|---|
| 4,831,975 A | | 5/1989 | Yoshimoto et al. |
| 5,056,613 A | * | 10/1991 | Porter .................. B60K 31/047 |
| | | | 123/361 |
| 5,156,439 A | | 10/1992 | Idlani et al. |
| 5,870,928 A | * | 2/1999 | Genter ................... F16H 55/18 |
| | | | 74/409 |
| 5,979,259 A | * | 11/1999 | Shook .................... F16H 55/18 |
| | | | 123/90.31 |
| 6,109,129 A | * | 8/2000 | Genter ................... F16H 55/18 |
| | | | 74/397 |
| 6,293,166 B1 | | 9/2001 | Genter et al. |
| 6,661,986 B2 | | 12/2003 | Kitayama |
| 7,383,750 B2 | * | 6/2008 | Menjak .................. B23P 15/14 |
| | | | 74/409 |
| 8,313,411 B2 | * | 11/2012 | Schafer ................ F16H 1/2863 |
| | | | 475/331 |
| 9,777,775 B2 | * | 10/2017 | van Lieshout ............ F16D 3/10 |
| 2010/0139431 A1 | | 6/2010 | Park |
| 2010/0242649 A1 | | 9/2010 | Vandewal et al. |
| 2015/0047450 A1 | | 2/2015 | Mitchum et al. |
| 2016/0053881 A1 | * | 2/2016 | Zeller .................... F16H 55/18 |
| | | | 74/440 |

\* cited by examiner

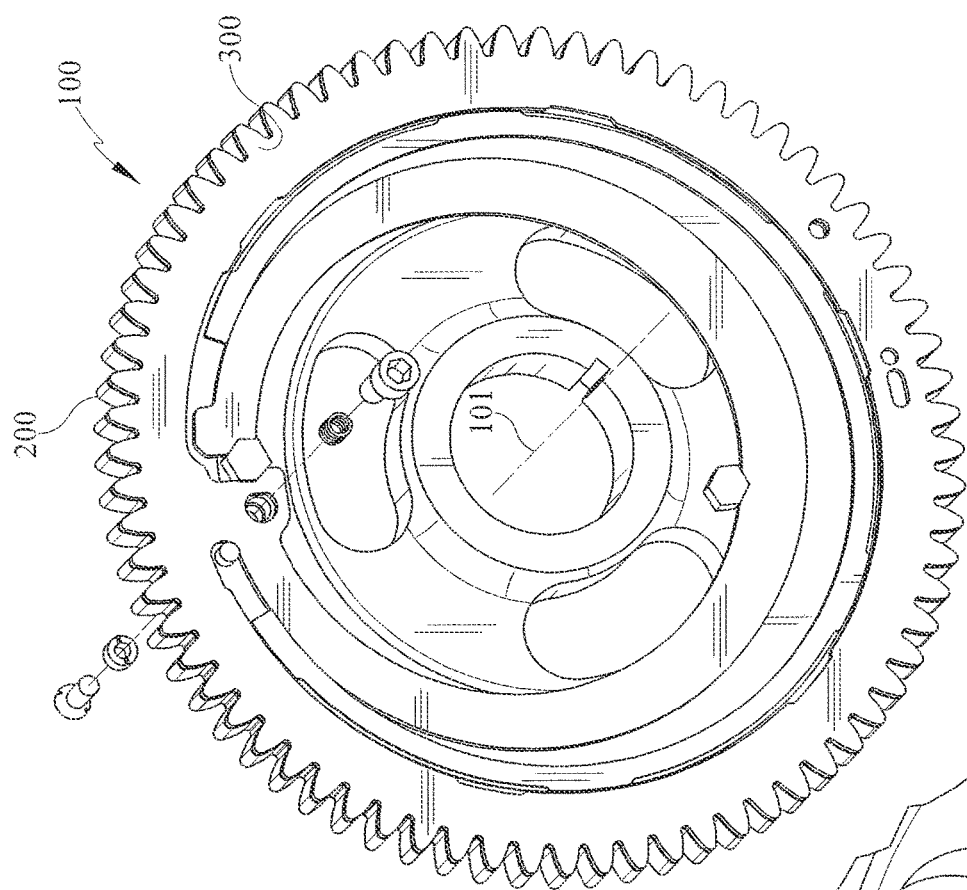
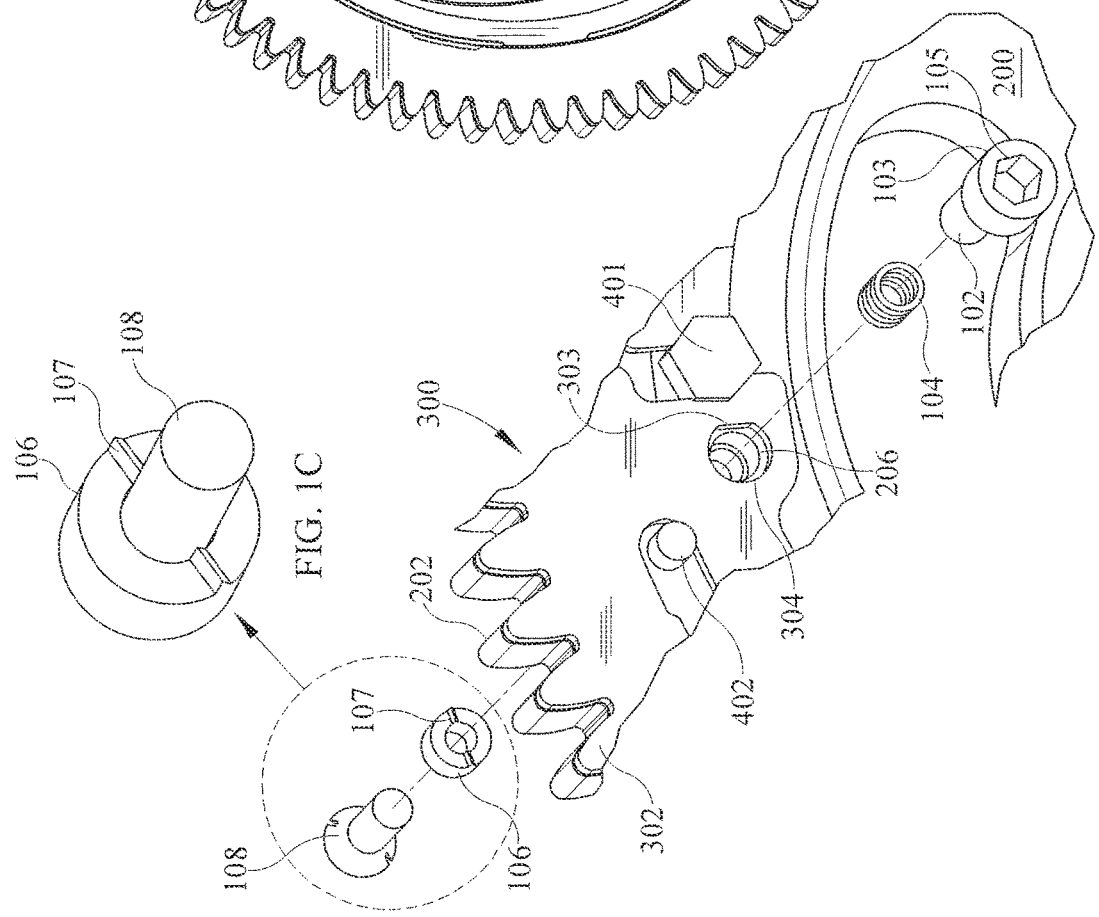
FIG. 1A
FIG. 1B
FIG. 1C

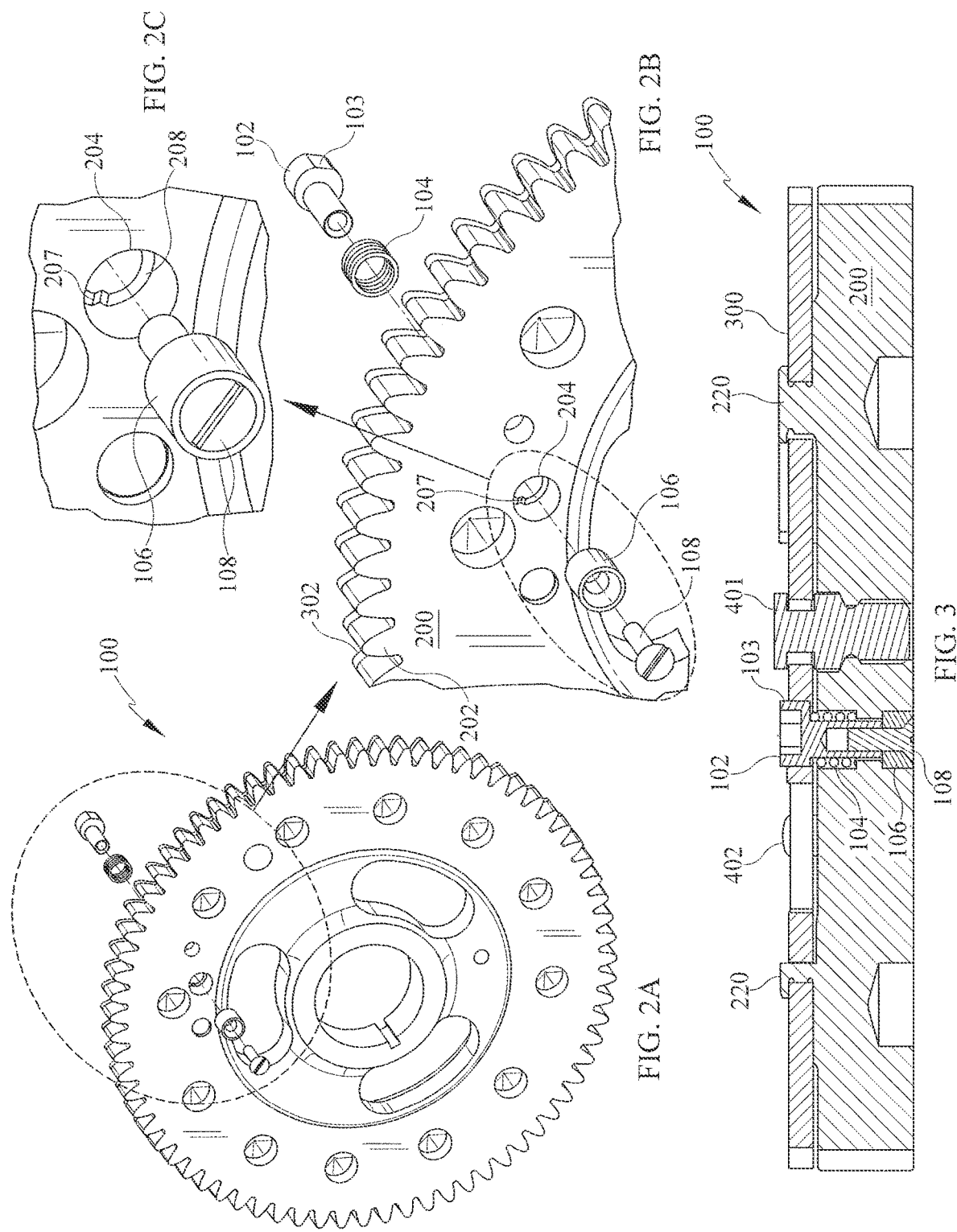

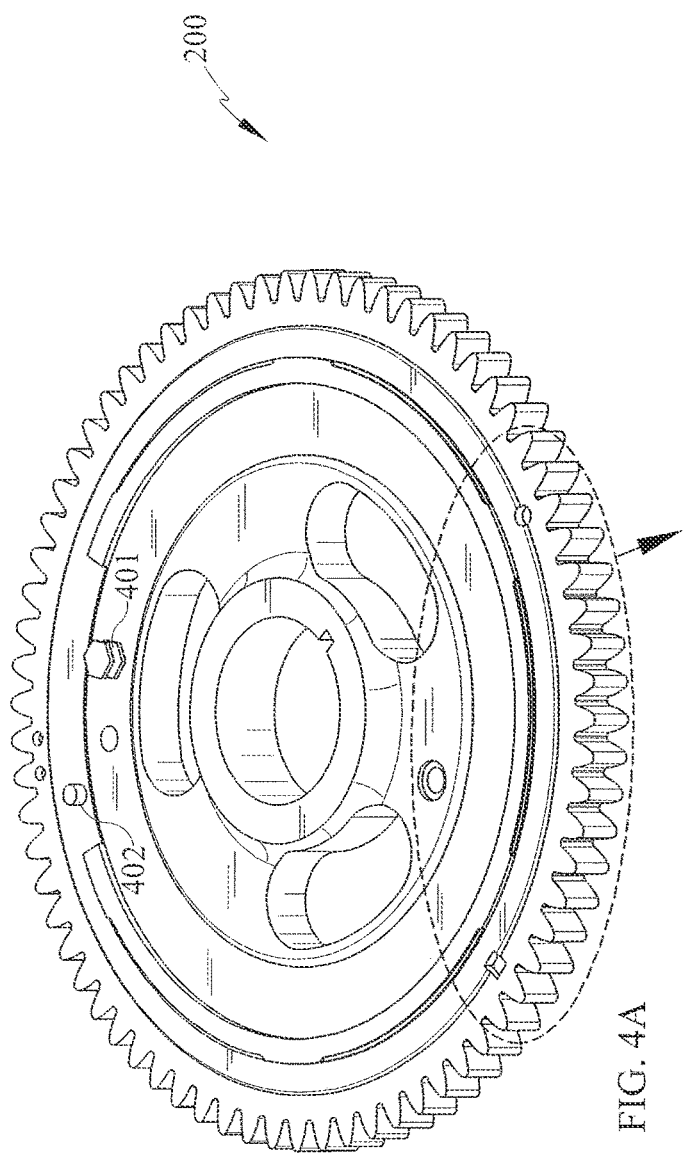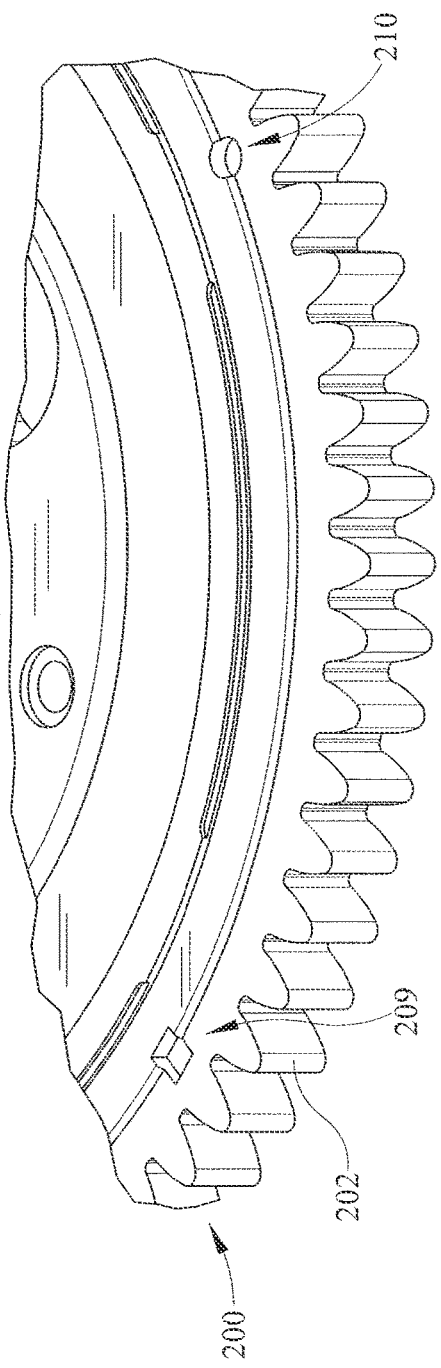
FIG. 4A
FIG. 4B

SCISSORS GEAR

CROSS-REFERENCE TO RELATED APPLICATION

The present application is a divisional application of U.S. patent application Ser. No. 13/967,932 filed on Aug. 15, 2013, which is incorporated herein by reference.

TECHNICAL FIELD

The present invention generally relates to scissors gears, and more particularly, but not exclusively, to structures to aid in installation of scissors gears.

BACKGROUND

Present approaches to aligning and installing scissors gears suffer from a variety of drawbacks, limitations, disadvantages and problems including those respecting aligning and installing scissors gears and others.

SUMMARY

One embodiment of the present invention is a unique structure for installing scissors gears. Other embodiments include apparatuses, systems, devices, hardware, methods, and combinations for scissors gears. Further embodiments, forms, features, aspects, benefits, and advantages of the present disclosure shall become apparent from the description and figures provided herewith.

BRIEF DESCRIPTION OF THE FIGURES

FIG. 1A is a partially exploded assembly view of an embodiment of the present disclosure, FIG. 1B is an enlarged exploded assembly view of a portion of FIG. 1A, and FIG. 1C is an assembled view of a component of the portion of FIG. 1A.

FIG. 2A is another partially exploded assembly view of the embodiment of FIG. 1A, FIG. 2B is an enlarged exploded assembly view of a portion of FIG. 2A, and FIG. 2C is an enlarged partially exploded assembly view of a portion of FIG. 2B.

FIG. 3 is a side cross-sectional view of the embodiment of FIG. 1A.

FIG. 4A is a perspective view of a main gear of another embodiment of the present disclosure and FIG. 4B is an enlarged view of a portion of FIG. 4A.

DETAILED DESCRIPTION OF THE ILLUSTRATIVE EMBODIMENTS

Figure 5:
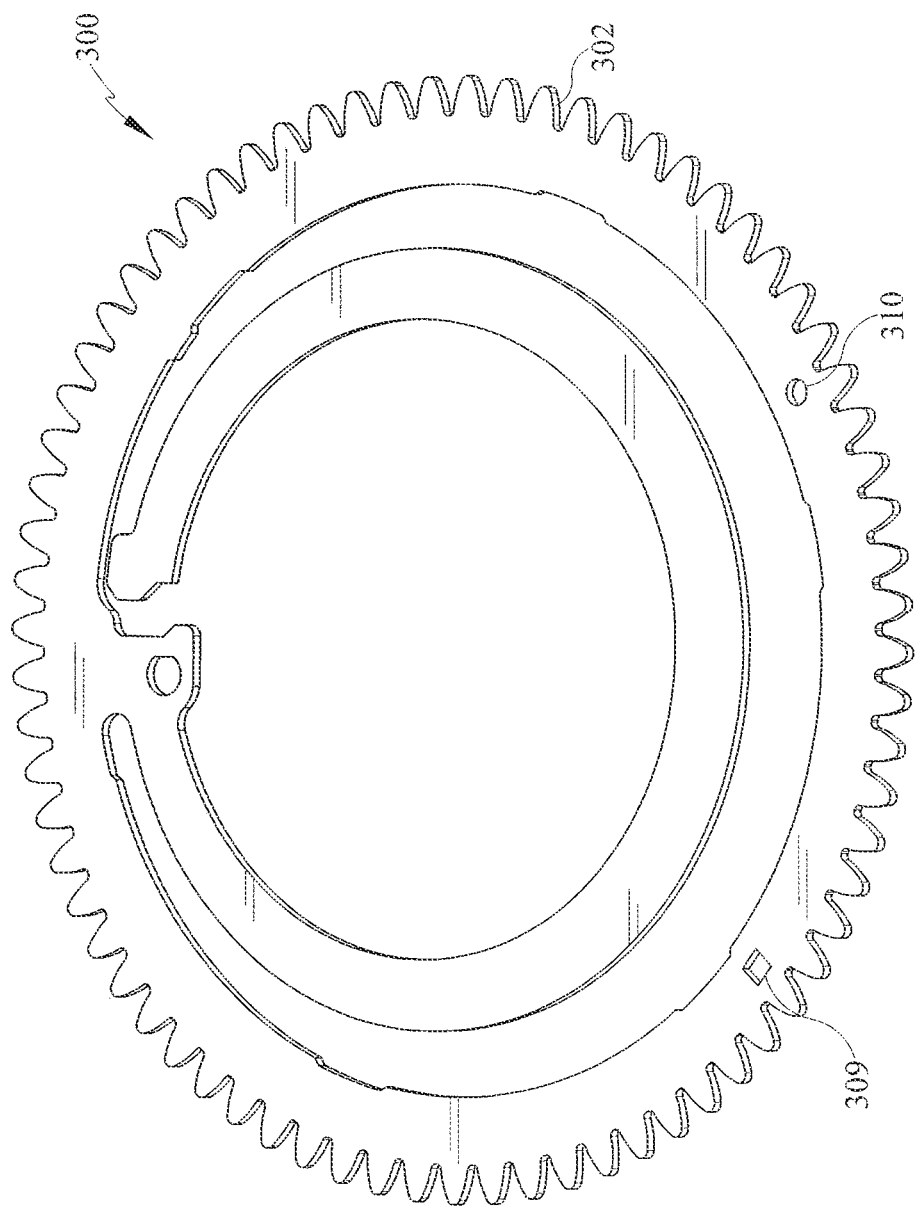
FIG. 5 is a perspective view of a bias gear to be coupled with the main gear of FIG. 4A.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

With reference to FIGS. 1A-3, an example scissors gear assembly 100 is provided with a rotary pin 102 used to align the gear teeth 202, 302 in order to properly install the scissors gear assembly 100. The scissors gear assembly 100 is provided with a main gear 200 and a bias gear 300 that share a common axis of rotation 101. The bias gear 300 is secured to the main gear 200 in any known fashion, and is preferably provided with or coupled to a biasing mechanism. As is shown in the example embodiment, the bias gear 300 is provided with a biasing mechanism by way of the manner in which it is cut and secured to the main gear. As shown, the bias gear 300 is attached to the front side of the main gear 200. While not necessary, the assembly 100 may be provided with one or more safety retention pins 401 to assist in holding bias gear 300 relative to main gear 200. The assembly 100 may also be provided with a press fit pin 402 that is received in a slot of bias gear 300. The pin 402 may be press fit in the main gear 200, or may be part of the main gear 200. For reliability, the tolerance between the pin 402 and the bias gear 300 may be kept as small as possible. Further, a retention ring 220 may be provided as part of the main gear 200. The bias gear 300 may be a single point spring or a multi-point spring.

The main gear 200 defines a first hole 204 that is a through hole. The first hole 204 is provided off of the shared common axis 101. The bias gear 300 defines a second hole 304 that is a through hole. The second hole 304 is provided off of the shared common axis 101 and at least partially aligns with the first hole 204.

A pin 102 is provided and disposed through the first and second holes 204, 304. The pin 102 is preferably provided with a lobe 103 that may be eccentric, asymmetric, or other known configuration. The pin 102 is provided with a detent that may be composed of, for example, a biasing member, such as a spring 104, a retainer 106, and a matingly engageable surface within the first hole 204, which may be, for example, in a shoulder 208 within the first hole 204. The retainer 106 may be secured to the pin 102 by a threaded fastener 108. The retainer 106 may have a male raised protrusion or projection 107, or a female recessed groove thereon. The matingly engageable surface may then correspondingly have a mating groove 207 (if the retainer has a protrusion or projection) or a mating notch (if the retainer has a groove). Any suitable geometry or combination is contemplated.

The spring 104 may be provided within a front portion of the main gear 200 and may be biased against a back-facing side of the pin 102 and a front-facing shoulder surface 206 within the first hole 204. The retainer 106 and threaded fastener 108 may then be attached to the pin 102 at a back-portion of the pin 102. The spring 104 acts to push against a front-facing shoulder surface 206 within the first hole 204 and pushes the pin 102 toward the front of the scissors gear assembly 100. This biasing action, in turn, pushes the retainer 106 against the matingly engageable surface and secures the protrusion or projection 107 within the groove 207. In this position, the pin 102 is secured in a first rotational position and the lobe 103 preferably does not contact any surface within the second hole 304.

The pin 102 may be depressed and advanced toward the main gear 200 to act against the biasing spring 104 and clear the retainer protrusion 107 from the groove 207 and allow the pin 102 to be rotated to a second rotational position. The pin 102 may be provided with a recess 105, and may be rotated via the recess 105 by any known means, such as by a screw driver, hex key, torx wrench, socket wrench, box wrench, pliers, by hand, or other known device. In the second position, the lobe 103 engages and contacts a side wall 303 of the second hole 304 in the bias gear 300. The contacting sidewall 303 in the second hole 304, may be flat or may be a mating geometry to the lobe, other configurations are contemplated. As shown, the second hole contacting sidewall 303 is flat. Rotating the pin 102 to the second rotational position pushes the lobe 103 against the contacting sidewall 303 and acts against the biasing action of the biasing mechanism of the bias gear 300. Thus, the bias gear 300 is rotated, and teeth 302 on the bias gear 300 may be aligned to teeth 202 on the main gear 200. In this configuration, the scissors gear assembly 100 may be installed in any known application. One such common application is on a camshaft of an internal combustion engine.

Once installed, the pin 102 may be returned to the first rotational position and the biasing spring 104 will then return the protrusion 107 and groove 207 of the detent into a mating engagement. Thus, pin 102 is locked in the first rotational position during operational use of the scissors gear assembly 100.

Figure 6:
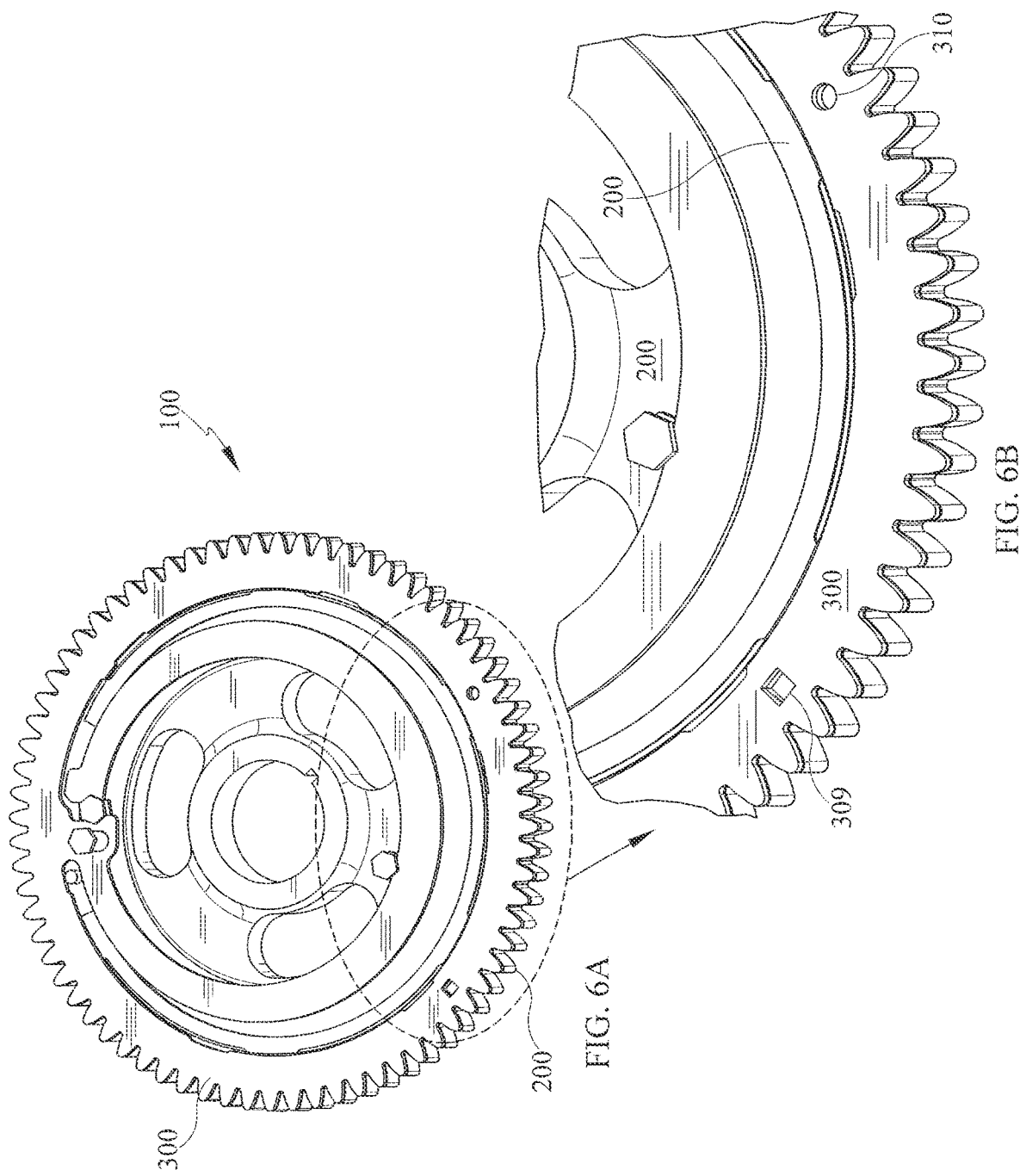
FIG. 6A is an assembled perspective view of the gears of FIGS. 4 and 5 and FIG. 6B is an enlarged view of a portion of FIG. 6A.
Figure 7:
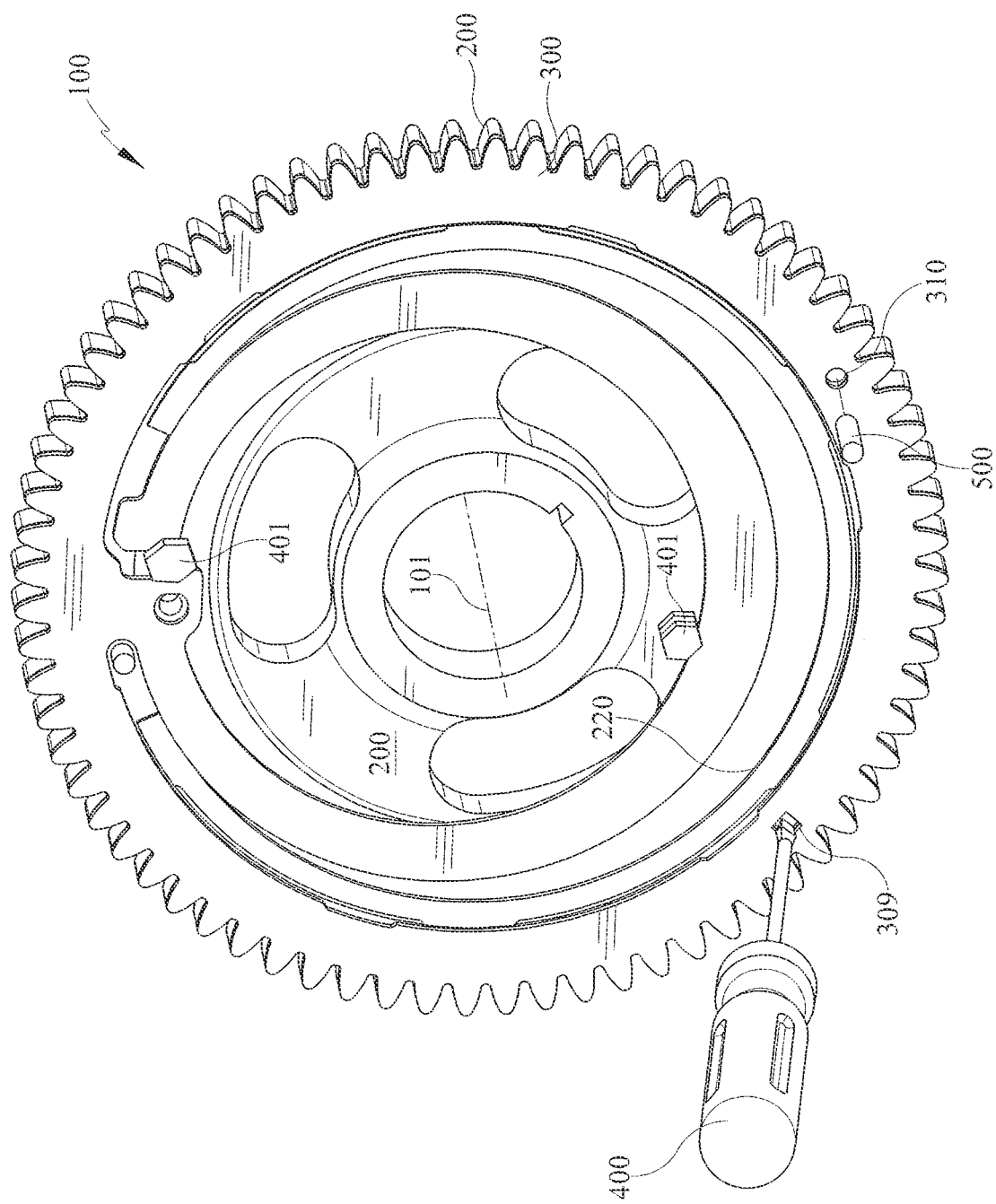
FIG. 7 is another assembled perspective view of the embodiment of FIG. 6A with an assembly tool.

Referring now to FIGS. 4A-7, another example embodiment of a scissors gear assembly 100 is provided with multiple holes 209, 210, 309, 310 used to align the gear teeth 202, 302 in order to properly install the scissors gear assembly 100. The scissors gear assembly 100 is provided with a main gear 200 and a bias gear 300 that share a common axis of rotation 101. The bias gear 300 is secured to the main gear 200 in any known fashion, and is preferably provided with or coupled to a biasing mechanism. As is shown in the example embodiment, the bias gear 300 is provided with a biasing mechanism by way of the manner in which it is cut and secured to the main gear 200. As shown, the bias gear 300 is attached to the front side of the main gear 200.

The main gear 200 defines a first hole 209 that is a pocket that is disposed off of the shared common axis 101. The bias gear 300 defines a second hole 309 that is a through hole and is disposed off of the shared common axis 101 and at least partially aligns with the first hole 209. The main gear 200 further defines a third hole 210 that is a pocket and is disposed off of the shared common axis 101, and the bias gear 300 further defines a fourth hole 310 that is a through hole and is disposed off of the shared common axis 101. The first and second holes 209, 309 at least partially overlap one another, while the third hole 210 and fourth hole 310 only align when the teeth 202, 302 of the main gear 200 and bias gear 300 are aligned.

A first separate component 400, such as, a screwdriver or other known tool, may be advanced or passed through the second hole 309 and into the first hole 209. The separate component 400 may then engage the sidewalls of the first and second holes 209, 309, overcoming the biasing mechanism of the bias gear 300, until the third hole 210 and fourth hole 310 are aligned. At this point, a second separate component 500, such as, a pin, another screwdriver, or other known tool, may be inserted and advanced or passed through the third and fourth holes 210, 310 to secure the teeth 202, 302 of the main gear 200 and bias gear 300 in alignment. As shown, the first and second holes 209, 309 are geometrically similar in shape and size, however this is not necessary. As is also shown, the third and fourth holes 210, 310 have cross-sections, as taken through a plane orthogonal to the common axis of rotation 101, that are geometrically congruent.

Once the scissors gear assembly 100 is aligned and secured by the second component 500, the first component 400 may be removed from the scissors gear assembly 100. With the scissors gear assembly 100 in alignment, the scissors gear 100 may be installed in any known application. One such common application is on a camshaft of an internal combustion engine. Once installed, the second component 500 may be removed and the biasing mechanism of the bias gear 300 will again be allowed to act freely.

Figure 8:
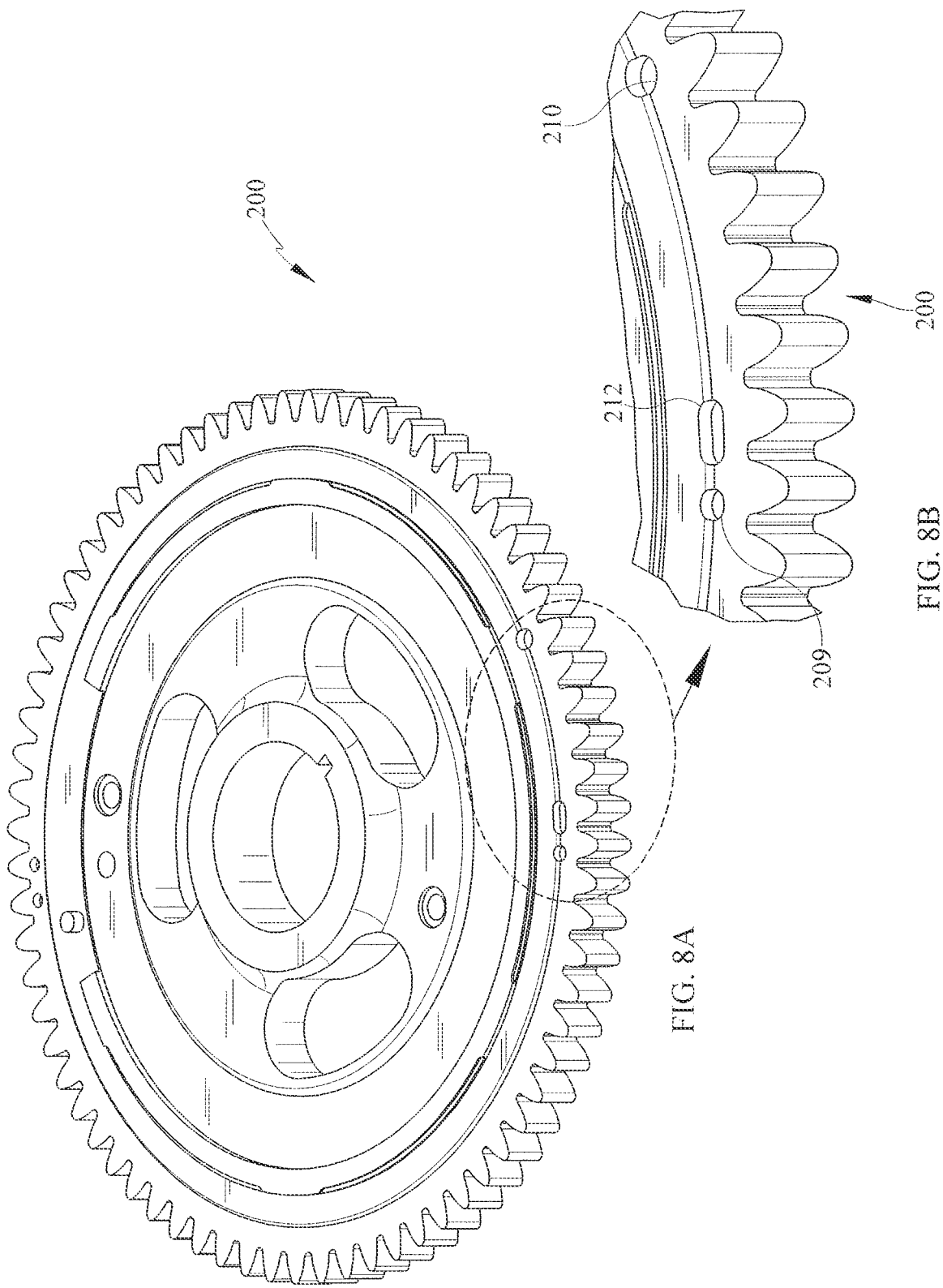
FIG. 8A is a perspective view of a main gear of another embodiment of the present disclosure and FIG. 8B is an enlarged view of a portion of FIG. 8A.
Figure 9:
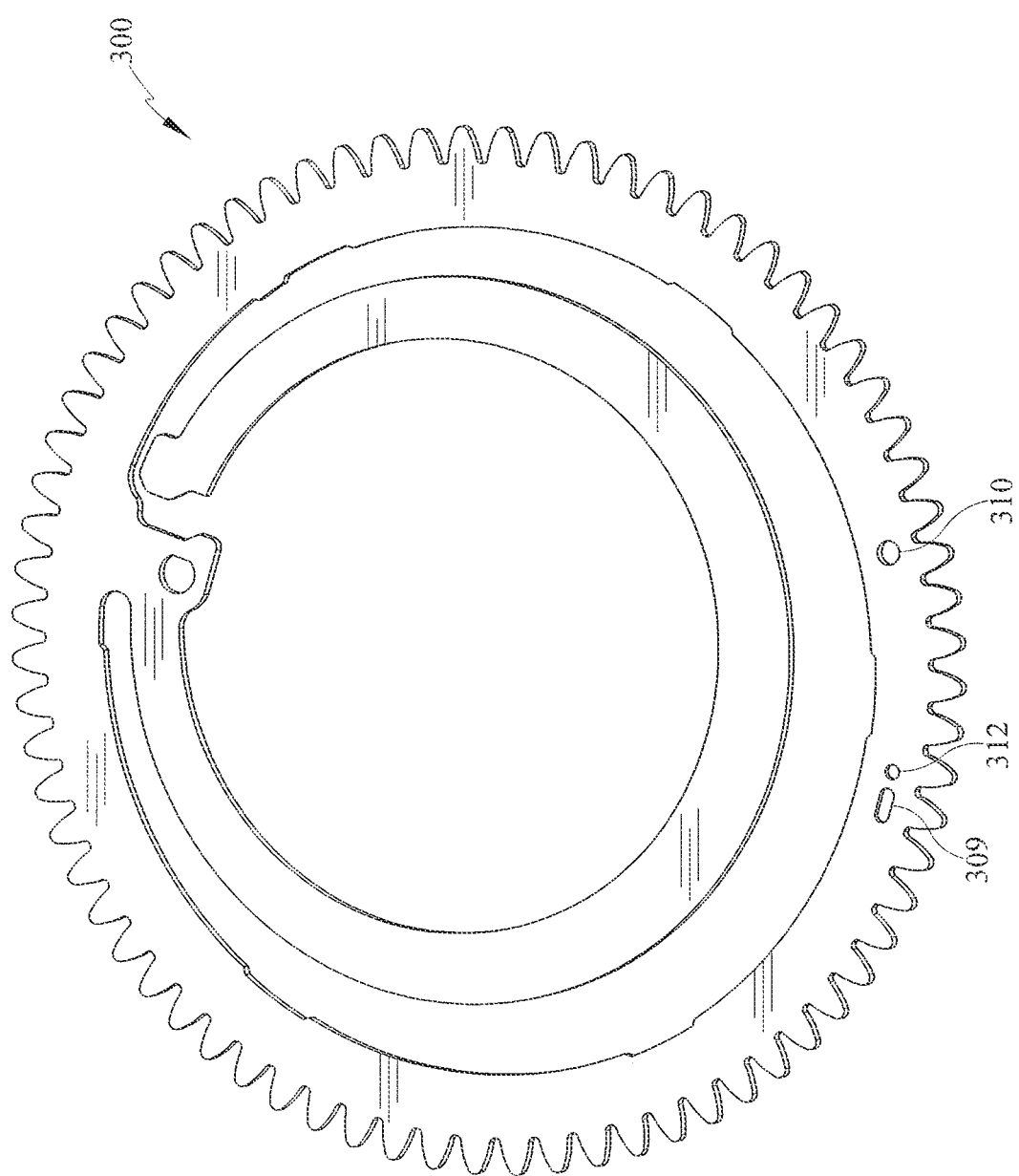
FIG. 9 is a perspective view of a bias gear to be coupled with the main gear of FIG. 8A.
Figures 10A, 10B:
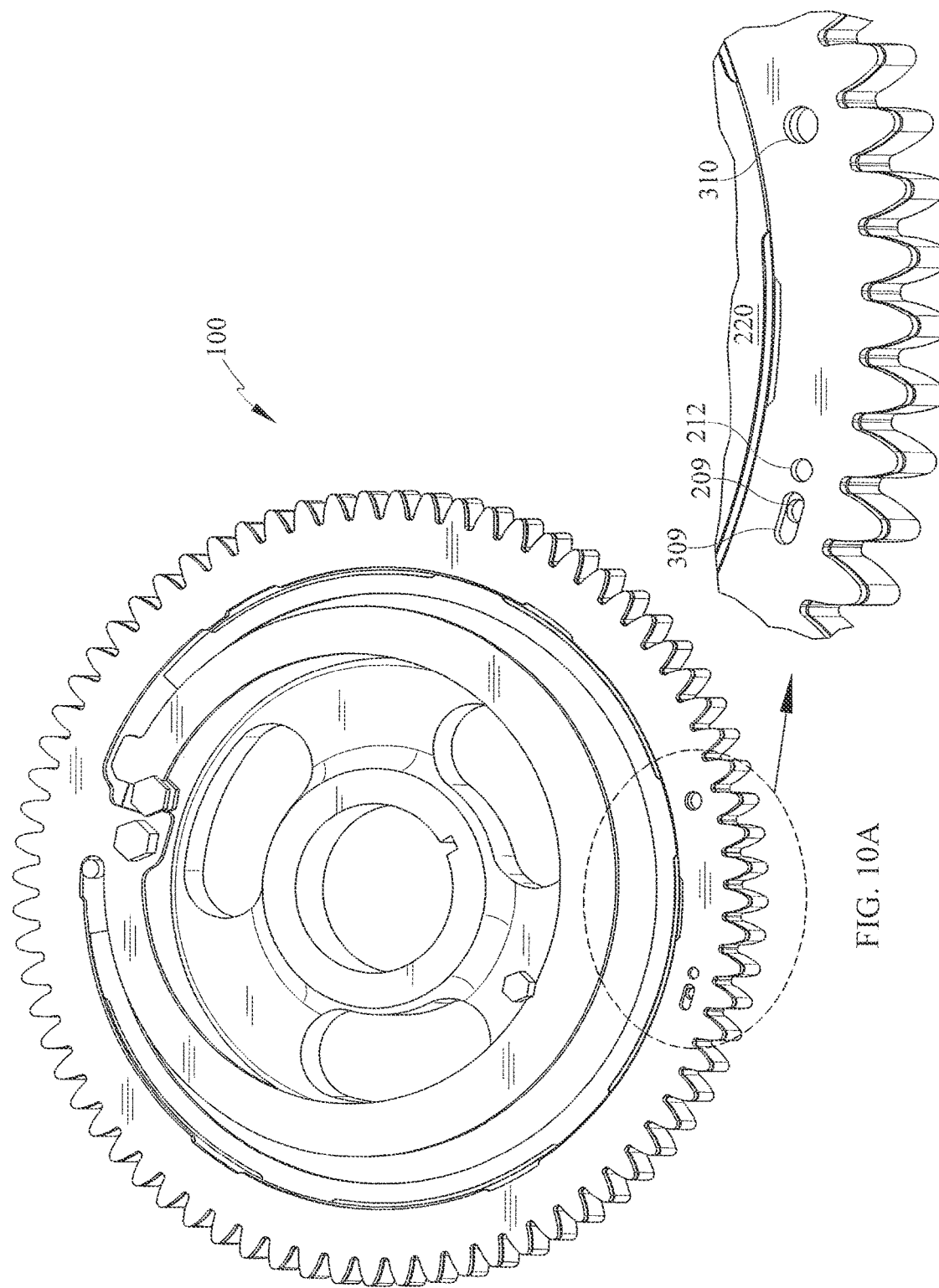
FIG. 10A is an assembled perspective view of the gears of FIGS. 8A and 9A and FIG. 10B is an enlarged view of a portion of FIG. 10A.
Figure 11:
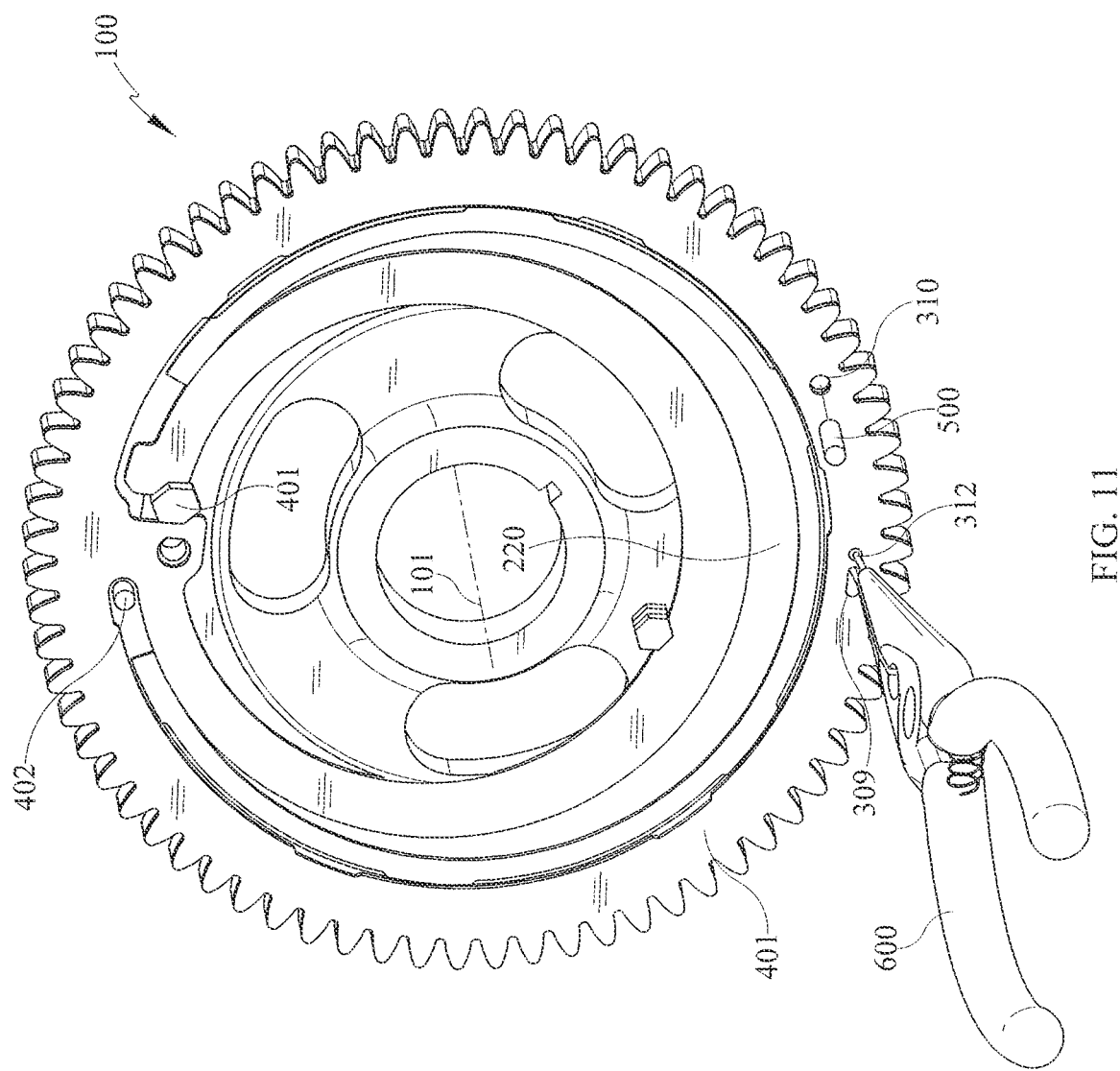
FIG. 11 is another assembled perspective view of the embodiment of FIG. 10A with an assembly tool.

Referring now to FIGS. 8A-11, another example embodiment of a scissors gear assembly 100 is provided with multiple holes 209, 210, 212, 309, 310, 312 used to align the gear teeth 202, 302 in order to properly install the scissors gear assembly 100. The scissors gear assembly 100 is provided with a main gear 200 and a bias gear 300 that share a common axis of rotation 101. The bias gear 300 is secured to the main gear 200 in any known fashion, and is preferably provided with or coupled to a biasing mechanism. As is shown in the example embodiment, the bias gear 300 is provided with a biasing mechanism by way of the manner in which it is cut and secured to the main gear 200. As shown, the bias gear 300 is attached to the front side of the main gear 200.

The main gear 200 defines a first hole 209 that is a pocket that is disposed off of the shared common axis 101. The bias gear 300 defines a second hole 309 that is a through hole and is disposed off of the shared common axis 101 and at least partially aligns with the first hole 209. The main gear 200 further defines a third hole 210 that is a pocket and is disposed off of the shared common axis 101, and the bias gear 300 further defines a fourth hole 310 that is a through hole and is disposed off of the shared common axis 101. The main gear 200 further defines a fifth hole 212 that is a pocket and is disposed off of the shared common axis 101, and the bias gear 300 further defines a sixth hole 312 that is disposed off of the shared common axis 101. The first and second holes 209, 309 at least partially overlap one another. While the third hole 210 and fourth hole 310 only align when the teeth 202, 302 of the main gear 200 and bias gear 300 are aligned. The fifth and sixth holes 212, 312 at least partially overlap one another, and are disposed adjacent to the first and second holes 209, 309.

A first separate component 600, such as, a split ring washer pliers or other known tool, may be advanced or passed through the second hole 309 and into the first hole 209, and through the sixth hole 312 into the fifth hole 212. For example, a first blade 602 of the pliers 600 may be inserted through the second hole 309 and into the first hole 209, while the second blade 604 is inserted into the sixth hole 312 and into the fifth hole 212. As shown, the first hole 209 is generally circular and the second hole 309 may be generally oblong. As also shown, the fifth hole 212 is generally oblong and the sixth hole 312 is generally circular. Also, the third and fourth holes 210, 310 have cross-sections, as taken through a plane orthogonal to the common axis of rotation, that are geometrically congruent.

With the blades 602, 604 of the pliers 600 advanced or passed into their respective holes 209, 309, 212, 312, the pliers 600 may be engaged or closed, thus engaging the first blade 602 into the sidewall of the first hole 209 while the first blade 602 slides through the oblong second hole 309, while simultaneously allowing the second blade 604 to engage the sidewall of the sixth hole 312 while the second blade 604 slides through the oblong fifth hole 212. This action overcomes the biasing mechanism of the bias gear 300, until the third hole 210 and fourth hole 310 are aligned. At this point, a second separate component 500, such as a pin, a screwdriver, or other known tool, may be inserted and advanced or passed through the third and fourth holes 210, 310 to secure the teeth 202, 302 of the main gear 200 and bias gear 300 in alignment.

Once the scissors gear assembly 100 is aligned and secured by the second component 500, the first component 600 may be removed from the scissors gear assembly 100. With the scissors gear assembly 100 in alignment, the scissors gear 100 may be installed in any known application. One such common application is on a camshaft of an internal combustion engine. Once installed, the second component 500 may be removed and the biasing mechanism will again be allowed to act freely.

One aspect of the present application provides a main gear and a bias gear, with the main gear and the bias gear having a shared axis of rotation. The main gear defines a first hole, and the first hole is displaced radially from a center of the main gear. The bias gear defines a second hole, and the second hole is displaced radially from a center of the bias gear. A pin is provided extending through the first hole and the second hole, and has a lobe thereon, with the lobe being disposed at least partially within the second hole. The pin has a first rotational position and a second rotational position. In the first rotational position, the lobe is clear of a side wall of the second hole, and in the second rotational position, the lobe alters a rotational alignment of the bias gear relative to the main gear.

A refinement of the apparatus is further provided with a detent securing the pin in the first rotational position. Another refinement of the apparatus provides the detent with a spring. The pin preferably has a rotational axis that is parallel to the common axis of rotation shared by the main gear and the bias gear, however other configurations are possible. It is appreciated that as the pin is rotated, the alignment between the first hole and second hole will change.

Another refinement of the apparatus provides the pin with an axis of rotation that is parallel to the shared axis of rotation.

Yet another refinement of the apparatus provides that in the second rotational position of the pin, teeth of the main gear and teeth of the bias gear are aligned.

Another refinement of the apparatus of provides the lobe as an eccentric lobe. Yet another refinement provides the love as an asymmetric lobe.

Another aspect of the present application provides a system with having an internal combustion engine having a camshaft thereon, and a scissors gear coupled to the camshaft. The scissors gear has a main gear and a bias gear having a common axis of rotation. A pin extends through the main gear and the bias gear, has a lobe, and is radially disposed away from the common axis of rotation. The pin has a first rotational position and a second rotational position. In the first rotational position, the lobe is clear of the bias gear, and in the second rotational position, the lobe alters a rotational alignment of the bias gear relative to the main gear.

A refinement of the system provides a detent coupled to the pin. Another refinement of the system provides the detent with a biasing member.

Another refinement of the system provides that in the first rotational position, the bias gear is rotationally biased with respect to the main gear by a biasing component of the bias gear.

Yet another refinement of the system provides that in the second rotational position, the bias gear is rotationally fixed with respect to the main gear.

Another refinement of the system provides that in the second rotational position, teeth on the bias gear are aligned with respect to teeth on the main gear.

Another aspect of the present application provides a method. A component is passed through a first hole defined in a main gear and a second hole defined in a bias gear, with the main gear and the bias gear defining a scissors gear. The component is engaged with the main gear and the bias gear such that teeth on the bias gear are aligned with teeth on the main gear. The scissors gear is coupled to a camshaft on an internal combustion engine. The component is disengaged from the main gear and the bias gear.

A refinement of the method further provides rotating the component.

Another refinement of the method provides rotating a lobe into the bias gear.

Yet another refinement of the method provides removing the component from the first hole and the second hole after disengaging.

Another refinement of the method further provides aligning a third hole defined in the main gear and a fourth hole defined in the bias gear. Yet another refinement to the method provides inserting a second component within the third hole and the fourth hole, after aligning.

Another refinement of the method provides advancing the component toward the main gear, prior to engaging.

Another aspect of the present application provides an apparatus, with a main gear and a bias gear, with the main gear and the bias gear having a shared axis of rotation. The main gear defines a first hole and a third hole, with the first hole and the third hole being displaced radially from a center of the main gear. The bias gear defines a second hole and a fourth hole, with the second hole and the fourth hole being displaced radially from a center of the bias gear, and with the bias gear having a biasing component. The bias gear has at least a first rotational position relative to the main gear and a second rotational position relative to the main gear. In the first rotational position, the second hole at least partially overlaps the first hole, and wherein in the second rotational position the third hole and the fourth hole are aligned.

A refinement of the apparatus provides that the third hole and the fourth hole have cross-sections that are geometrically congruent.

Another refinement of the apparatus provides that the second hole and the fourth hole are through holes.

Yet another refinement of the apparatus provides that the first hole and the third hole are pockets defined within the main gear.

Another aspect of the present application provides an apparatus having a main gear and a bias gear, with the main gear and the bias gear having a shared axis of rotation. The main gear defines a first hole, a third hole, and a fifth hole, wherein the first hole, the third hole, and the fifth hole are displaced radially from a center of the main gear. The bias gear defines a second hole, a fourth hole, and a sixth hole, wherein the second hole, the fourth hole, and the sixth hole are displaced radially from a center of the bias gear, and with the bias gear having a biasing component. The bias gear has at least a first rotational position relative to the main gear and a second rotational position relative to the main gear. In the first rotational position, the second hole at least partially overlaps the first hole, and the fifth hole at least partially overlaps the sixth hole.

Another refinement of the present application provides that in the second rotational position, the third hole and the fourth hole are aligned.

Yet another refinement of the apparatus provides that the third hole and the fourth hole have cross-sections that are geometrically congruent.

Another refinement of the apparatus provides that the first hole and the sixth hole are oblong.

Another aspect of the present application provides a kit having the aforementioned apparatus with a pair of split ring washer pliers. A refinement of the kit provides a pin.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. An apparatus comprising:
    a main gear and a bias gear that are assembled to form a scissors gear assembly, wherein said main gear and said bias gear comprise a shared axis of rotation;
    said main gear defining a first hole and a third hole, wherein said first hole and said third hole are displaced radially from a center of said main gear, said main gear having a plurality of main gear teeth;
    said bias gear defining a second hole and a fourth hole, wherein said second hole and said fourth hole are displaced radially from a center of said bias gear, and wherein said bias gear comprises an integral biasing component and a plurality of bias gear teeth; and
    a component that passes through the second hole and into the first hole to engage sidewalls of the first and second holes to overcome the biasing component to rotate the bias gear from a first rotational position wherein said plurality of bias gear teeth are not aligned with said plurality of main gear teeth relative to the main gear to a second rotational position relative to the main gear such that said plurality of bias gear teeth are rotated into alignment with said plurality of main gear teeth; and
    wherein in said first rotational position:
        said second hole at least partially overlaps said first hole such that said second hole is not axially aligned with said first hole,
        said third hole and said fourth hole are not axially aligned, and
    wherein in said second rotational position:
        said second hole is axially aligned with said first hole, and
        said third hole and said fourth hole are axially aligned.

2. The apparatus of claim 1, wherein said third hole and said fourth hole have cross-sections that are geometrically congruent.

3. The apparatus of claim 1, wherein said second hole and said fourth hole are through holes.

4. The apparatus of claim 1, wherein said first hole and said third hole are pockets defined within said main gear.

5. The apparatus of claim 1, wherein in said second rotational position, said bias gear is rotationally fixed with respect to said main gear.

6. The apparatus of claim 5, further comprising a second component that passes through the third and fourth holes to secure teeth on said bias gear in alignment with teeth on said main gear.

7. The apparatus of claim 1, wherein in said second rotational position, said biasing component is engaged such that said bias gear is rotationally biased with respect to said main gear.

8. The apparatus of clam 1, wherein the component is removable from the second hole and the first hole such that the biasing gear is operable relative to the main gear.

9. An apparatus comprising:
    a main gear and a bias gear that are assembled to form a scissors gear assembly, wherein the main gear and the bias gear comprise a shared axis of rotation;
    the main gear defining a first hole and a third hole, wherein the first hole and the third hole are displaced radially from a center of the main gear, the main gear having a plurality of main gear teeth;
    the bias gear defining a second hole and a fourth hole, wherein the second hole and the fourth hole are displaced radially from a center of the bias gear, and wherein the bias gear comprises an integral biasing component and a plurality of bias gear teeth;
    wherein the bias gear is rotatable relative to the main gear from a first rotational position wherein the plurality of bias gear teeth are not aligned with the plurality of main gear teeth to a second rotational position wherein the plurality of bias gear teeth are aligned with the plurality of main gear teeth;
    a component that passes through the second hole and into the first hole to engage sidewalls of the first and second holes to overcome the biasing component to thereby rotate the bias gear from the first rotational position to the second rotational position relative to the main gear to rotate the plurality of bias gear teeth into alignment with the plurality of main gear teeth; and
    wherein in the first rotational position:
        the second hole at least partially overlaps the first hole such that the second hole is not axially aligned with the first hole, the third hole and the fourth hole are not axially aligned, and wherein in the second rotational position:
the second hole is axially aligned with the first hole, and
the third hole and the fourth hole are axially aligned.

10. The apparatus of clam 9, wherein the component is removable from the second hole and the first hole such that the biasing gear is operable relative to the main gear.

* * * * *